United States Patent [19]
Owen

[11] Patent Number: 5,664,791
[45] Date of Patent: Sep. 9, 1997

[54] SPIRAL WOUND GASKET BRIDGED TO GUIDE RING

[75] Inventor: Richard S. Owen, Houston, Tex.

[73] Assignee: Lamons Metal Gasket Co., Houston, Tex.

[21] Appl. No.: 651,690

[22] Filed: May 21, 1996

Related U.S. Application Data

[60] Provisional application No. 60/008,643, Dec. 14, 1995.

[51] Int. Cl.⁶ .................................................... F16J 15/12
[52] U.S. Cl. .............................. 277/204; 277/11; 277/180
[58] Field of Search .............................. 277/11, 180, 204

[56] References Cited

U.S. PATENT DOCUMENTS

| | | |
|---|---|---|
| Re. 29,702 | 7/1978 | Owen et al. . |
| 1,100,182 | 6/1914 | Hettinger . |
| 1,636,363 | 7/1927 | Hettinger . |
| 1,942,703 | 1/1934 | Hubbard et al. . |
| 2,196,953 | 4/1940 | Bohmer, Jr. et al. . |
| 2,200,212 | 5/1940 | Bohmer, Jr. et al. . |
| 2,339,479 | 1/1944 | McCreary . |
| 2,520,089 | 8/1950 | Lippincott . |
| 2,809,080 | 10/1957 | Mittell et al. . |
| 2,827,320 | 3/1958 | Kane . |
| 2,828,987 | 4/1958 | Schmitz . |
| 2,882,083 | 4/1959 | Palumbo et al. . |
| 3,093,383 | 6/1963 | Lew ........................................ 277/204 |
| 3,529,836 | 9/1970 | Hyde . |
| 3,556,541 | 1/1971 | Salono . |
| 3,573,873 | 4/1971 | Pearson . |
| 3,815,927 | 6/1974 | Geipel . |
| 3,926,445 | 12/1975 | Farnam . |
| 4,019,244 | 4/1977 | Owen et al. . |
| 4,189,819 | 2/1980 | Nicholson . |
| 4,364,982 | 12/1982 | Gee . |
| 4,411,605 | 10/1983 | Sauls ........................................ 277/204 |
| 4,455,334 | 6/1984 | Ogino et al. . |
| 4,505,485 | 3/1985 | Hirakawa ................................. 277/204 |
| 4,564,343 | 1/1986 | Nakamura et al. ...................... 277/204 |
| 4,607,851 | 8/1986 | Usher ....................................... 277/204 |
| 4,673,187 | 6/1987 | Hanson et al. . |
| 4,826,181 | 5/1989 | Howard . |
| 5,161,807 | 11/1992 | Allen et al. . |
| 5,275,423 | 1/1994 | Allen et al. . |

Primary Examiner—William A. Cuchlinski, Jr.
Assistant Examiner—Christina Annick
Attorney, Agent, or Firm—Edgar A. Zarins; Malcolm L. Sutherland

[57] ABSTRACT

A spiral wound gasket for sealing between sections of pipe and which includes means for preventing buckling of the spiral winding during compression. The gasket includes a solid outer guide ring for limiting compression of the gasket and positioning the gasket in the pipe. The spiral winding is constructed of a metal band interspersed with a sealant material. The outer diameter of the spiral winding is less than the inner winding of the guide ring creating a gap therebetween. In order to bridge the gap to maintain connection between the winding and guide ring, an outer section of winding is looped to engage the guide ring. These loops biasingly bridge the gap allowing radially outward expansion of the winding as the gasket is sealingly compressed thereby preventing buckling of the spiral winding.

17 Claims, 3 Drawing Sheets

5,664,791

SPIRAL WOUND GASKET BRIDGED TO GUIDE RING

This application claims the benefit of U.S. Provisional Patent Application No. 60/008,643 filed on Dec. 14, 1995.

BACKGROUND OF THE INVENTION

I. Field of the Invention

This invention relates to spiral wound gaskets for sealing between connected flanges of pipe sections and, in particular, to a spiral wound gasket which reduces inward buckling of the spiral winding upon application of clamping pressure between the pipe flanges.

II. Description of the Prior Art

Spiral wound gaskets are extensively used in the petroleum industry to seal between sections of pipe connected by their end flanges. A series of bolts are used to tie the flanges together by applying a predetermined stress to the bolts. A spiral wound gasket is positioned between the pipe flanges to eliminate fluid leakage between the flanges. The typical spiral wound gasket comprises a winding of metal and an outer guide ring. The winding has a thickness greater than the thickness of the guide ring such that the winding can be compressed between the flanges while the metal guide ring acts as a stop against further compression. Despite the compression limit provided by the guide ring, deformation of the winding can occur as the gasket is being compressed between the flanges.

As the spiral wound gasket is compressed, the winding, which comprises spiral wound layers of metal with a sealing material therebetween for improved sealing, will be laterally compressed under the force of the flanges. The clamping force causes the sealing material to flow between the metal windings attempting to find an outlet while creating a sealing surface. With lateral flow prevented by the flanges of the pipe and diametrically outward flow prevented the guide ring, the sealing material may eventually cause the windings to buckle inwardly into the pipe chamber. Buckling of the winding causes two immediate problems: first, the sealing capabilities of the gasket are compromised and, second, the protrusions disrupt the flow of fluids through the pipe.

One means of eliminating inward buckling is to attach a solid inner ring on the inside diameter of the winding. However, the inner ring significantly increases the cost of the gasket.

SUMMARY OF THE PRESENT INVENTION

The present invention overcomes the disadvantages of the prior known spiral wound gaskets by providing space between the winding and the outer guide ring allowing the winding to naturally expand outwardly during compression eliminating the inward pressure which can cause buckling.

The spiral wound gasket of the present invention is primarily of a typical construction with a winding and an outer guide ring. The outer ring is a solid metal ring with a known thickness, an outer diameter corresponding to the required diameter for the pipe connection, and a predetermined inner diameter. The gasket winding preferably includes a spiral wound metal with a sealing material (such as flexible graphite) interspersed between the spiral layers. The width of the metal band forming the winding creates a thickness for the winding portion which is greater than the thickness of the guide ring. The winding is formed with an inner diameter slightly larger than the inner diameter of the pipe flanges. The outer diameter of the winding is substantially less than the inner diameter of the guide ring such that upon assembly of the guide ring and winding a gap is formed therebetween. The typical spiral wound gasket is formed with the substantially equal diameters creating a snug fit between the winding and guide ring. In contrast, the inner diameter of the guide ring is greater than the outer diameter of the winding preventing the components from being directly assembled. Accordingly, means are provided for biasingly attaching the winding to the guide ring. However, the gap remains allowing the winding to expand outwardly under compression which relieves pressure on the inside diameter and reduces or eliminates the windings tendency to buckle towards the inside.

In a preferred embodiment, the gap is bridged by looped windings extending radially outwardly from the winding portion to attach the winding and guide ring while permitting outward expansion of the windings. The outer winding is "bunched" to create a series of loops along the outer diameter of the winding. The ends of the loops are secured, such as by spot welds, to prevent collapse of the loops. As an alternative, springs or other biasing means may be inserted in the gap between the winding and guide ring to secure the components of the spiral wound gasket while maintaining the gap between the winding and the guide ring. Nevertheless, the essential feature of the present invention is a winding portion which is not restricted on its outside diameter relieving radial pressure during compression and eliminating buckling of the winding.

Other objects, features, and advantages of the invention will be apparent form the following detailed description taken in connection with the accompanying drawings.

BRIEF DESCRIPTION OF THE DRAWING

The present invention will be more fully understood by reference to the following detailed description of a preferred embodiment of the present invention when read in conjunction with the accompanying drawings, in which like reference characters refer to like parts throughout the views and in which.

DETAILED DESCRIPTION OF A PREFERRED EMBODIMENT OF THE PRESENT INVENTION

Figure 1:
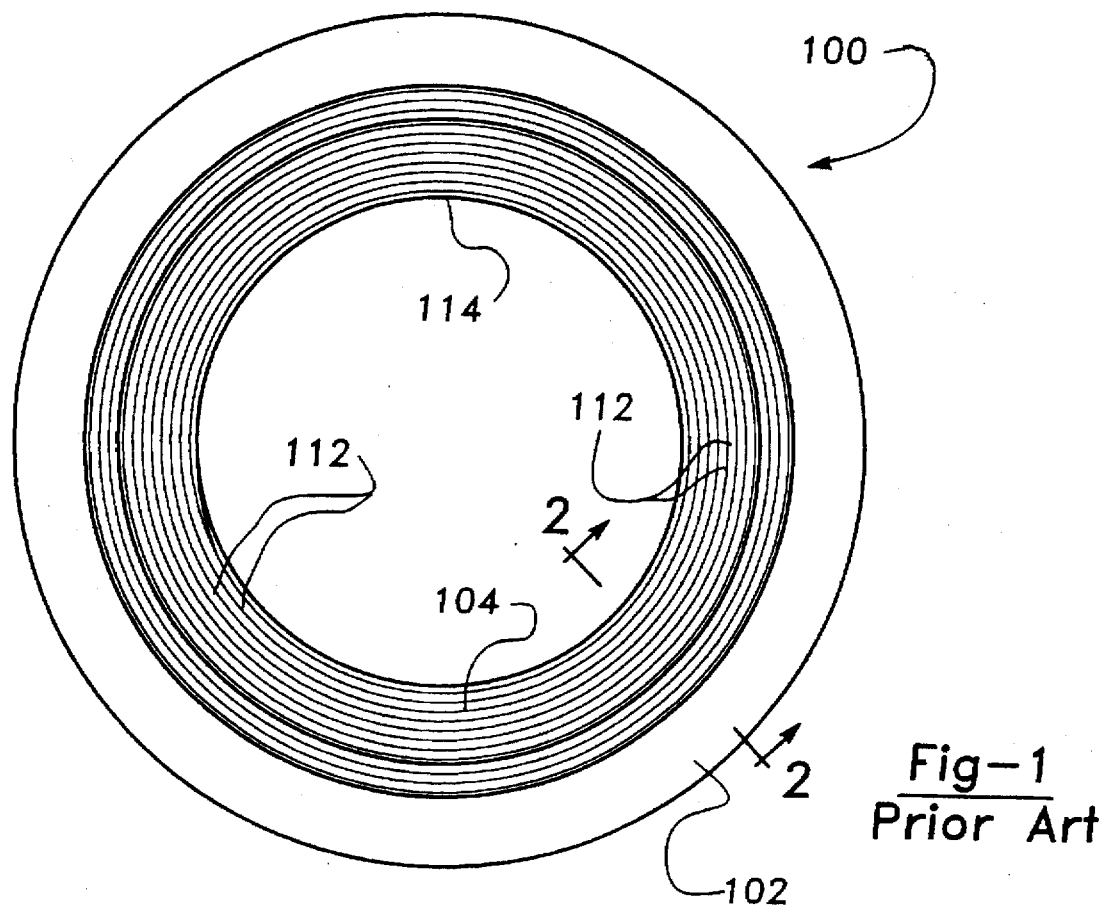
FIG. 1 is a face view of a spiral wound gasket of the prior art.
Figure 2:
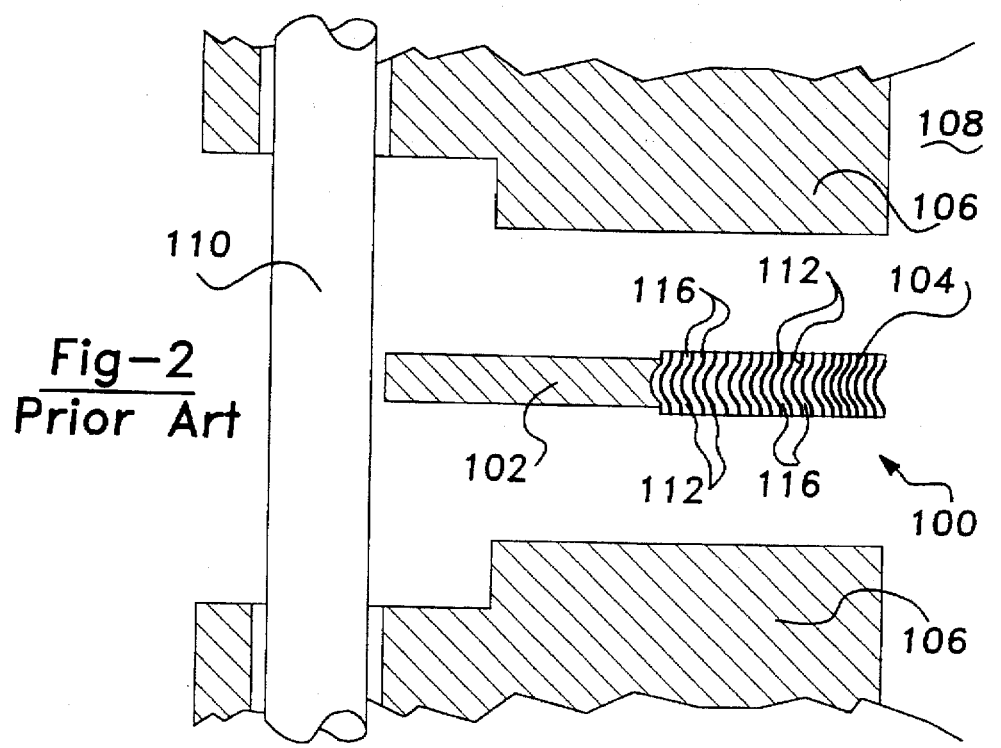
FIG. 2 is a cross-sectional view of the prior art spiral wound gasket disposed between pipe flanges.
Figure 3:
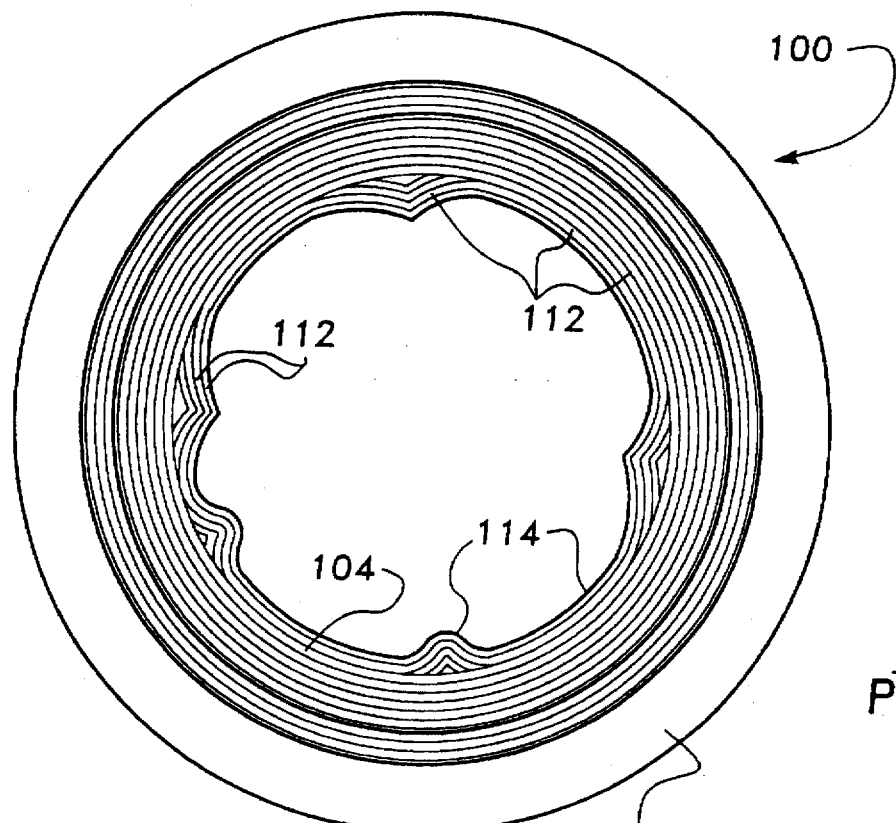
FIG. 3 is a face view of a damaged prior art gasket with the windings buckled inwardly.

Referring first to FIGS. 1 through 3, there is shown a spiral wound gasket 100 as is well known in the prior art. The prior art gasket 100 includes an outer guide ring 102 and a winding portion 104. The outer guide ring 102 is a planar metal ring used to limit compression of the gasket 100 between the flanges 106 of the pipes 108 while also positioning the gasket 100 within the pipe joint. Bolts 100 are used to secure the flanges 106 of the pipe 108 which creates a compressive force on the gasket 100 thereby sealing the pipe joint. The winding portion 104 of a typical gasket 100 may include a metal band or "wire" 112 spirally wound about an inner diameter 114 which is slightly larger than the pipe throughbore 108. Interspersed between the metal windings 112 is a sealing material such as an elastomer or flexible graphite 116. Generally, the winding portion 104 has a thickness which is greater than the thickness of the outer guide ring 102 allowing compression of the winding 104 to seal between the flanges 106.

The outer guide ring 102 and winding 104 of the prior known gaskets 100 are constructed to be matingly attached. The inner diameter of the guide ring 102 is substantially equal to the outer diameter of the winding 104 such that the winding 104 snugly fits within the guide ring 102 to prevent separation. As a result, during compression of the gasket 100 the winding 104 is prevented from expanding radially outwardly by the solid guide ring 102. As compressive force is applied to the gasket 100 by the pipe flanges 106 as the bolts 110 are tightened, the sealant material interspersed between the windings 112 will "flow" seeking an escape from the compressive force. However, the guide ring 102 prevents radially outward flow and the pipe flanges 106 prevent lateral flow. Accordingly, as compressive force is maintained, the winding 104 may buckle radially inwardly as shown in FIG. 3 compromising the sealing integrity of the gasket 100 and extending into the fluid path of the pipe 108. The gasket 100 is often damaged beyond repair and must be replaced causing a shut-down of the pipeline 108. Shut-downs of the pipeline 108 due to the failure of the gasket 100 are not popular with the pipeline operator.

Figure 4:
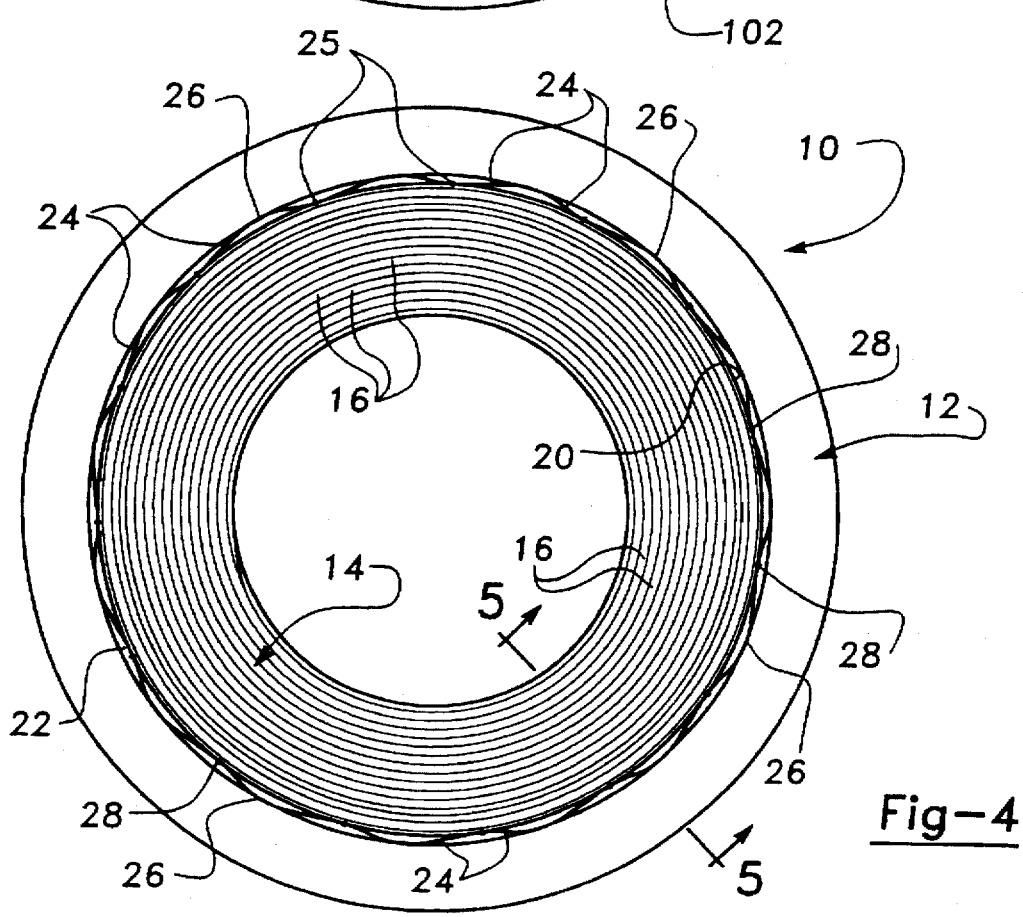
FIG. 4 is a face view of a preferred embodiment of the spiral wound gasket of the present invention.
Figure 5:
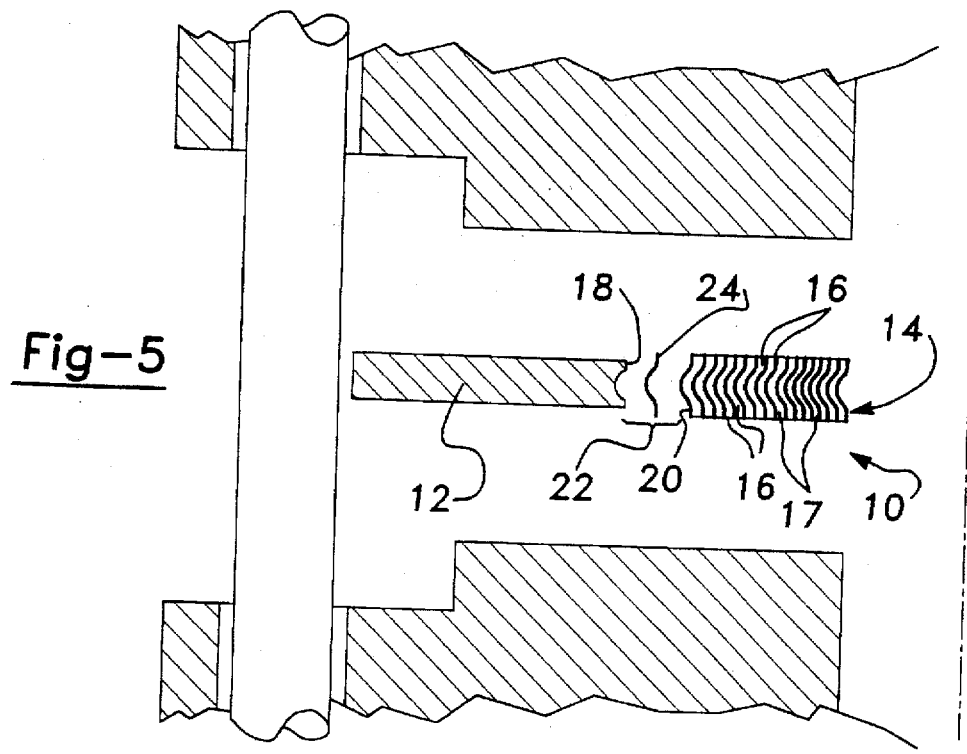
FIG. 5 is a cross-sectional view of the spiral wound gasket taken along lines 5—5 of FIG. 4.
Figure 6:
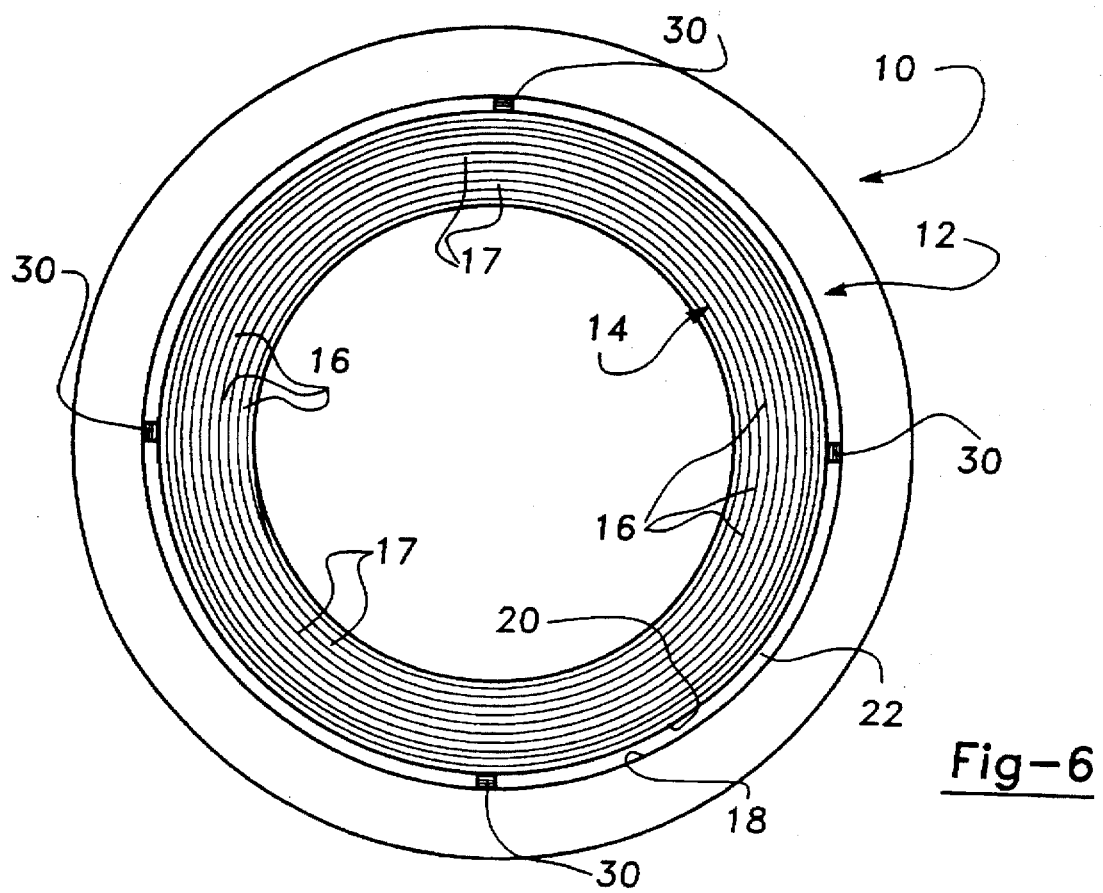
FIG. 6 is an alternative embodiment of the spiral wound gasket.

The present invention shown in FIGS. 4 through 6 reduces the likelihood of inward buckling of the winding thereby maintaining the sealing integrity of the gasket. Broadly the present invention relieves the pressure resulting from compression by allowing radial outward expansion of the winding. The winding portion is not restricted on its outside diameter and therefore does not tend to buckle. This is accomplished by making the inside diameter of the guide ring larger than the outside diameter of the winding thereby forming a gap between the winding and guide ring. Means are provided for maintaining connection between the outer ring and winding across the gap.

The gasket 10 of the present invention includes a guide ring 12 and winding portion 14 substantially as is well known in the prior art. The winding portion 14 includes a spirally wound metal band 16 interspersed with a sealant 17 such as flexible graphite. The guide ring 12 has an inner diameter 18 which is substantially greater than the outer diameter 20 of the spiral winding portion 14 such that upon insertion of the winding 14 into the guide ring 12, a gap 22 is formed between the diameters 18 and 20. However, with the size differential, the winding 14 would fall out of the guide ring 12. The present invention includes means for bridging the gap 22 to maintain connection between the guide ring 12 and the winding 14 during shipment and handling prior to installation. Two embodiments are described herein although other means of connecting the guide ring 12 and winding 14 while maintaining the gap 22 for expansion will become readily apparent.

A first embodiment of the invention is shown in FIGS. 4 and 5. The gap 22 between the guide ring 12 and winding 14 is bridged by an extension of the metal bands 16 forming the winding 14. The metal band is formed into a plurality of loops 24 which engage the guide ring 12 at the vertex 26 of the loop 24. The loops 24 are formed by intermittently securing the extension of the band 16 to the outer diameter 20 of the winding 14 by spot welding 28 or other well known means forming ends 25 of the loops 24.

Alternative connective support may be provided by pins or springs 30 as shown in FIG. 6. In fact, any means for connecting the guide ring 12 and winding 14 are contemplated by the present invention as long as the gap 22 therebetween is maintained to allow outward expansion of the guide ring 14 during compression of the spiral wound gasket 10.

The foregoing detailed description has been given for clearness of understanding only and no unnecessary limitations should be understood therefrom as some modifications will be obvious to those skilled in the art without departing from the scope and spirit of the appended claims,

What is claimed is:

1. A spiral wound gasket for sealing of a fluid conductor, said gasket comprising:

an outer guide ring having a predetermined inner diameter;

a spiral winding having a predetermined outer diameter substantially less than said inner diameter of said outer guide ring forming a slot between said spiral winding and said guide ring; and means for bridging said slot to connect said spiral winding and said guide ring, said means circumferentially spaced within said slot between said winding and said guide ring facilitating radial outward expansion of said spiral winding relative to said outer guide ring.

2. The gasket as defined in claim 1 wherein said spiral winding includes interspersed windings of metal and a sealant.

3. The gasket as defined in claim 2 wherein said bridging means comprises a winding of metal extending radially outwardly from said spiral winding and engaging said outer guide ring.

4. The gasket as defined in claim 3 wherein said winding of metal forming said bridging means between said spiral winding and said guide ring includes a plurality of arcuate loops engaging said outer guide ring, said arcuate loops spanning said slot between said spiral winding and said guide ring.

5. The gasket as defined in claim 4 wherein said arcuate loops have a parabolic curvature with a pair of ends, said loop ends secured to said spiral winding and a vertex of said loop engaging said guide ring.

6. The gasket as defined in claim 4 wherein said arcuate loops have a sinusoidal curvature, an inner vertex of said sinusoidal loops secured to said spiral winding and an outer vertex of said sinusoidal loops engaging said guide ring.

7. The gasket as defined in claim 6 wherein said inner vertex of said sinusoidal loops are welded to said spiral winding.

8. A spiral wound gasket for sealing of a fluid conductor, said gasket comprising:

an outer guide ring having a predetermined inner diameter;

multiple windings forming a spiral winding of interspersed metal windings and sealant windings, said spiral winding having a predetermined outer diameter substantially less than said inner diameter of said outer guide ring forming a circular slot between said spiral winding and said guide ring; and means for bridging said slot to biasingly connect said spiral winding and said guide ring, said bridging means circumferentially spaced about said spiral winding to form a substantially uniform slot and facilitating radial outward expansion of said spiral winding relative to said outer guide ring during sealing compression of said gasket.

9. The gasket as defined in claim 8 wherein said bridging means comprises a single winding of metal extending radially outwardly from said spiral winding and engaging said outer guide ring.

10. The gasket as defined in claim 9 wherein said winding of metal forming said bridging means between said spiral winding and said guide ring includes a plurality of arcuate loops engaging said outer guide ring, said arcuate loops spanning said slot between said spiral winding and said guide ring.

11. The gasket as defined in claim 10 wherein said arcuate loops have a parabolic curvature with a pair of ends, said loop ends secured to said spiral winding and a vertex of said loop engaging said guide ring.

12. The gasket as defined in claim 10 wherein said arcuate loops have a sinusoidal curvature, an inner vertex of said sinusoidal loops secured to said spiral winding and an outer vertex of said sinusoidal loops engaging said guide ring.

13. The gasket as defined in claim 12 wherein said inner vertex of said sinusoidal loops are welded to said spiral winding.

14. A spiral wound gasket for sealing of a fluid conductor, said gasket comprising:

a solid outer guide ring having a predetermined inner diameter, said guide ring limiting compression of said gasket;

multiple windings forming a spiral winding of interspersed metal windings and sealant windings, said spiral winding having a predetermined outer diameter substantially less than said inner diameter of said outer guide ring forming a circular slot between said spiral winding and said guide ring; and means for bridging said slot to connect said spiral winding and said guide ring, said means including a single winding of metal formed into a plurality of arcuate loops within said slot and extending simultaneously about said spiral winding and engaging said outer guide ring thereby facilitating radial outward expansion of said spiral winding relative to said outer guide ring during sealing compression of said gasket.

15. The gasket as defined in claim 14 wherein said plurality of arcuate loops engaging said outer guide ring span said slot between said spiral winding and said guide ring.

16. The gasket as defined in claim 15 wherein said arcuate loops have a sinusoidal curvature, an inner vertex of said sinusoidal loops secured to said spiral winding and an outer vertex of said sinusoidal loops engaging said guide ring.

17. The gasket as defined in claim 16 wherein said inner vertex of said sinusoidal loops are welded to said spiral winding.

* * * * *